United States Patent
Kato et al.

(10) Patent No.: US 7,204,036 B2
(45) Date of Patent: Apr. 17, 2007

(54) LINEAR GUIDE APPARATUS

(75) Inventors: Soichiro Kato, Kitagunma-gun (JP);
Nobuhide Kurachi, Fujisawa (JP);
Masaru Akiyama, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/959,312

(22) Filed: Oct. 7, 2004

(65) Prior Publication Data
US 2005/0115096 A1 Jun. 2, 2005

(30) Foreign Application Priority Data

| Oct. 9, 2003 | (JP) | ............................. 2003-350922 |
| Nov. 26, 2003 | (JP) | ............................. 2003-395786 |
| Nov. 27, 2003 | (JP) | ............................. 2003-398158 |
| Jun. 21, 2004 | (JP) | ............................. 2004-182707 |

(51) Int. Cl.
*F16C 29/06* (2006.01)

(52) U.S. Cl. ........................................ 33/706; 384/44

(58) Field of Classification Search ................. 33/706, 33/707, 708, 1 M, 503; 384/43, 44, 45
See application file for complete search history.

(56) References Cited

U.S. PATENT DOCUMENTS

| 4,420,194 A | * | 12/1983 | Asami | ......................... 384/45 |
| 4,427,240 A | * | 1/1984 | Teramachi | ................... 384/45 |
| 4,428,627 A | * | 1/1984 | Teramachi | ................... 384/45 |
| 4,576,420 A | * | 3/1986 | Lehmann et al. | ............. 384/45 |
| 5,118,204 A | * | 6/1992 | Peters | ......................... 384/42 |
| 5,200,014 A | * | 4/1993 | Peters | ........................ 156/245 |
| 5,727,884 A | * | 3/1998 | Greiner et al. | ................ 384/45 |
| 6,390,679 B1 | * | 5/2002 | Kashiwagi | .................... 384/45 |
| 6,729,760 B2 | * | 5/2004 | Mochizuki et al. | ........... 384/45 |
| 7,090,400 B2 | * | 8/2006 | Kato et al. | .................... 384/44 |
| 2004/0175061 A1 | * | 9/2004 | Chen | .......................... 384/45 |
| 2005/0115096 A1 | * | 6/2005 | Kato et al. | ..................... 33/76 |
| 2005/0281497 A1 | * | 12/2005 | Akiyama et al. | ............. 384/44 |
| 2006/0120637 A1 | * | 6/2006 | Kuwabara | .................... 384/44 |

FOREIGN PATENT DOCUMENTS

JP 03292412 A * 12/1991

* cited by examiner

*Primary Examiner*—R. Alexander Smith
(74) *Attorney, Agent, or Firm*—Crowell Moring LLP

(57) ABSTRACT

Rolling element holding members have two holding window for holding rolling elements in rolling element running channels formed between both track faces of a rail and a slider. Further, the rolling element holding members are held between two end caps fixed opposite end surfaces of the slider by engagement of four retaining grooves formed on the end caps and opposite end portions of the rolling element holding members.

19 Claims, 20 Drawing Sheets

F I G. 2 3 A
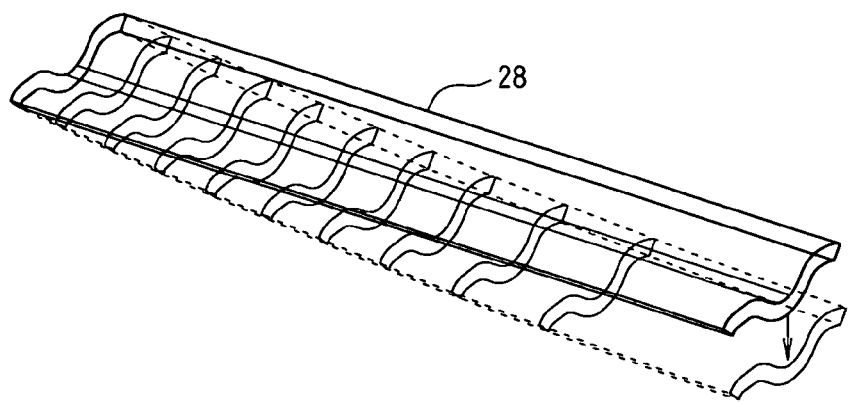
F I G. 2 3 B
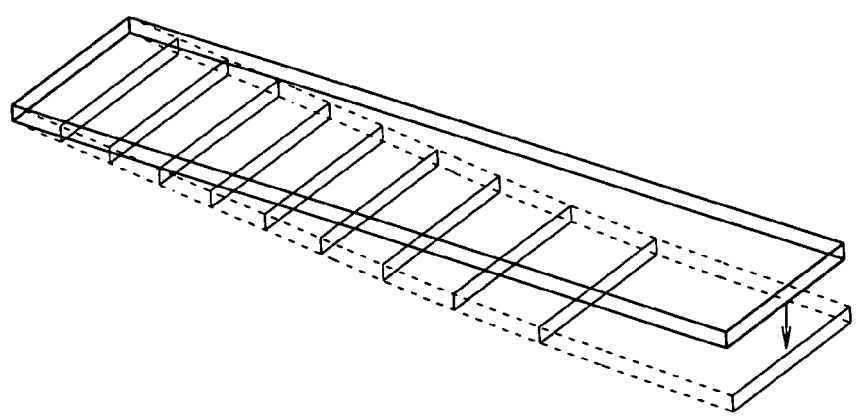

LINEAR GUIDE APPARATUS

BACKGROUND OF THE INVENTION

1. Field of the Invention

The present invention concerns a linear guide apparatus used as an apparatus for guiding a linearly moving body in industrial machines such as machine tools or injection molders.

2. Description of the Related Art

A linear guide apparatus comprising a rail, a saddle-shaped slider having slider-side track faces facing to rail-side track faces formed on the rail, end caps fixed on opposite end surfaces of the slider, plural rolling elements that roll along running channels formed between the rail-side track faces and the slider-side track faces, and rolling element holding members having opposite end portions that are engaged with engaging portions formed on the end caps is disclosed in Japanese Patent Publication No. 63-8330 (JP63-8330B). The holding members of the linear guide apparatus disclosed in this publication has rectangular windows for holding the rolling elements arranged in the running channels and scooping portions for detaching the rolling elements from the windows. The scooping portions of the holding members are formed at opposite ends of the windows.

However, in the linear guide apparatus described above, the start point of the scooping portions is disposed to the side nearer to the slider than the end portions of the holding members. Accordingly, when the rolling elements tend to detach from the windows of the holding members, external force exerts on the scooping portions of the holding members, to cause a possibility that the holding members are elastically deformed toward the rail and in contact with the rail by the external force.

The present invention has been achieved for solving the foregoing problem and a first object thereof is to provide a linear guide apparatus capable of suppressing the deformation of the holding members to the side of the rail and contact thereof with the rail. A second object of the present invention is to provide a linear guide apparatus capable of obtaining stable movement of rolling elements in the direction conversion channels of the end caps. A third object of the present invention is to provide a linear guide apparatus capable of preventing the rolling element from popping out of the holding members when the slider is assembled to the rail. A fourth object of the present invention is to provide a linear guide apparatus capable of ensuring smooth running of the slider.

SUMMARY OF THE INVENTION

A linear guide apparatus according to the first present invention comprises a rail having a right lateral face and a left lateral face, a slider having end caps at opposite ends thereof and slider-side track faces facing to a first rail-side track faces and a second rail-side track faces respectively formed on the right and left lateral faces of the rail, a plurality of rolling elements that roll on the rail-side track faces and the slider-side track faces along with relative linear movement of the slider to the rail, and rolling element holding members having rolling element holding windows formed each into a elongate shape along the rail, wherein the rolling element holding members are disposed between the end caps by engagement of retaining portions formed on the end caps and opposite end portions of the rolling element holding members.

In the linear guide apparatus according to the first present invention, it is preferred that the rolling element holding members have scooping portions for detaching the rolling elements from the windows, the windows are formed on the rolling element holding members such that the scooping portions are located exterior to the opposite end surfaces of the slider on the side of the end caps. Further, the retaining portions may be retaining grooves and may be inclined at a predetermined angle relative to the slider-side track faces. Further, the retaining portions may be formed parallel with the rail-side track faces.

Further, the rolling element holding members preferably are positioned between slider-side track faces by positioning grooves formed on the slider. Further, the rolling element holding members preferably have engaging portions engaging with positioning portions respectively formed on the end caps.

Further, the windows of the rolling element holding members preferably have corners each formed into an arcuate shape. Further, the windows of the rolling element holding members preferably have an arc shaped cut portion at corners thereof.

A linear guide apparatus according to the second present invention comprises a rail having a right lateral face and a left lateral face, a slider having slider-side track faces facing to a first rail-side track faces and a second rail-side track faces respectively formed on the right and left lateral faces of the rail, a plurality of rolling elements that roll on the rail-side track faces and the slider-side track faces along with relative linear movement of the slider to the rail, rolling element holding members having windows for holding the rolling elements situated between the rail-side track faces and the slider-side track faces, and reinforcing members for reinforcing the holding members, wherein the reinforcing members are buried in the holding members made of a resin.

In the linear guide apparatus according to the second present invention, the reinforcing members may have two plate portions situated between the rail-side track faces and the slider-side track faces. Further, the plate portions of the reinforcing members may have a guide window for guiding the rolling elements in the longitudinal direction of the rail.

A linear guide apparatus according to the third present invention comprises a rail having a right lateral face and a left lateral face, a slider having slider-side track faces facing to a first rail-side track faces and a second rail-side track faces respectively formed on the right and left lateral faces of the rail, a plurality of rolling elements that roll on the rail-side track faces and the slider-side track faces along with relative linear movement of the slider to the rail, and rolling element holding members made of a resin having rolling element holding portions for holding the rolling elements situated between the rail-side track faces and the slider-side track faces, in which the slider has positioning grooves for positioning the holding members, wherein reinforcing members for reinforcing the rolling element holding members are further provided, and the reinforcing members have a length substantially equal with that of the holding members.

In the linear guide apparatus according to the third present invention, it is preferably that the reinforcing members are formed into a plate shape. Further, the rolling element holding members may be have an engaging portion for engaging one of the positioning grooves of the slider. Further, the engaging portion of the rolling element holding members preferably has a reinforcing member attaching surface at a portion opposed to the rail. Further, the rolling element holding members preferably have plural fingers engaging with the reinforcing member in order to fixing the reinforcing member on the reinforcing member attaching surface of the engaging portion. Further, the rolling element holding members preferably have a protrusion engaging with a positioning hole formed in the reinforcing member.

A linear guide apparatus according to the fourth present invention comprises a rail having a right lateral face and a left lateral face, a slider having slider-side track faces facing to a first rail-side track faces and a second rail-side track faces respectively formed on the right and left lateral faces of the rail, end caps fixed on opposite end surfaces of the slider in the longitudinal direction of the rail, a plurality of rolling elements that roll on the rail-side and the slider-side track faces along with relative linear movement of the slider to the rail, and rolling element holding members having two rolling element holding portions situated between the rail-side track faces and the slider-side track faces and a connection portion for connecting the rolling element holding portions, wherein the connection portion of the rolling element holding members have protrusions that engage with the positioning grooves of the slider.

In the linear guide apparatus according to the fourth present invention, it is preferably that the rolling element holding members are assembled to the slider in a state convex at the side opposite to the rail.

BRIEF DESCRIPTION OF THE DRAWINGS

FIGS. 23A and 23B are views schematically showing the deformation amount of holding members in a case of using the reinforcing member in FIG. 18 and in a case of using a plate-like reinforcing member as a reinforcing member buried in a rolling element holding member.

BRIEF DESCRIPTION OF THE PREFERRED EMBODIMENT

A first embodiment of the present invention is to be described with reference to FIG. 1 to FIG. 13.

Figure 1:
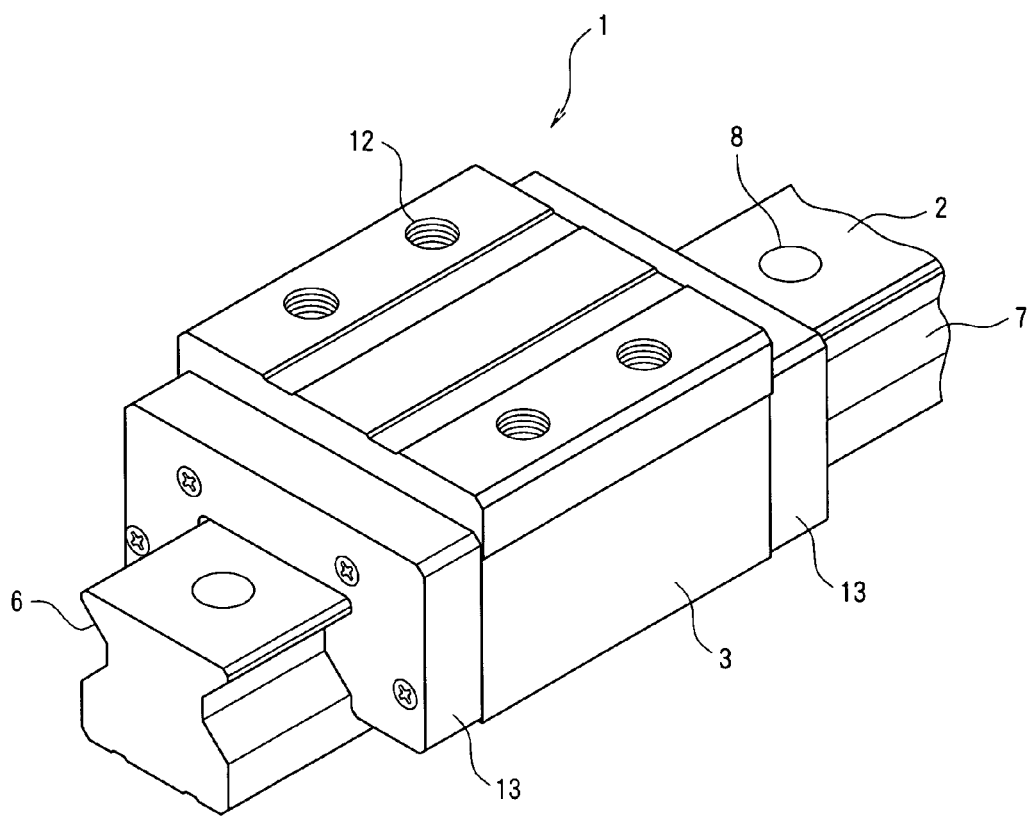
FIG. 1 is a perspective view showing a linear guide apparatus according to a first embodiment of the present invention.
Figure 2:
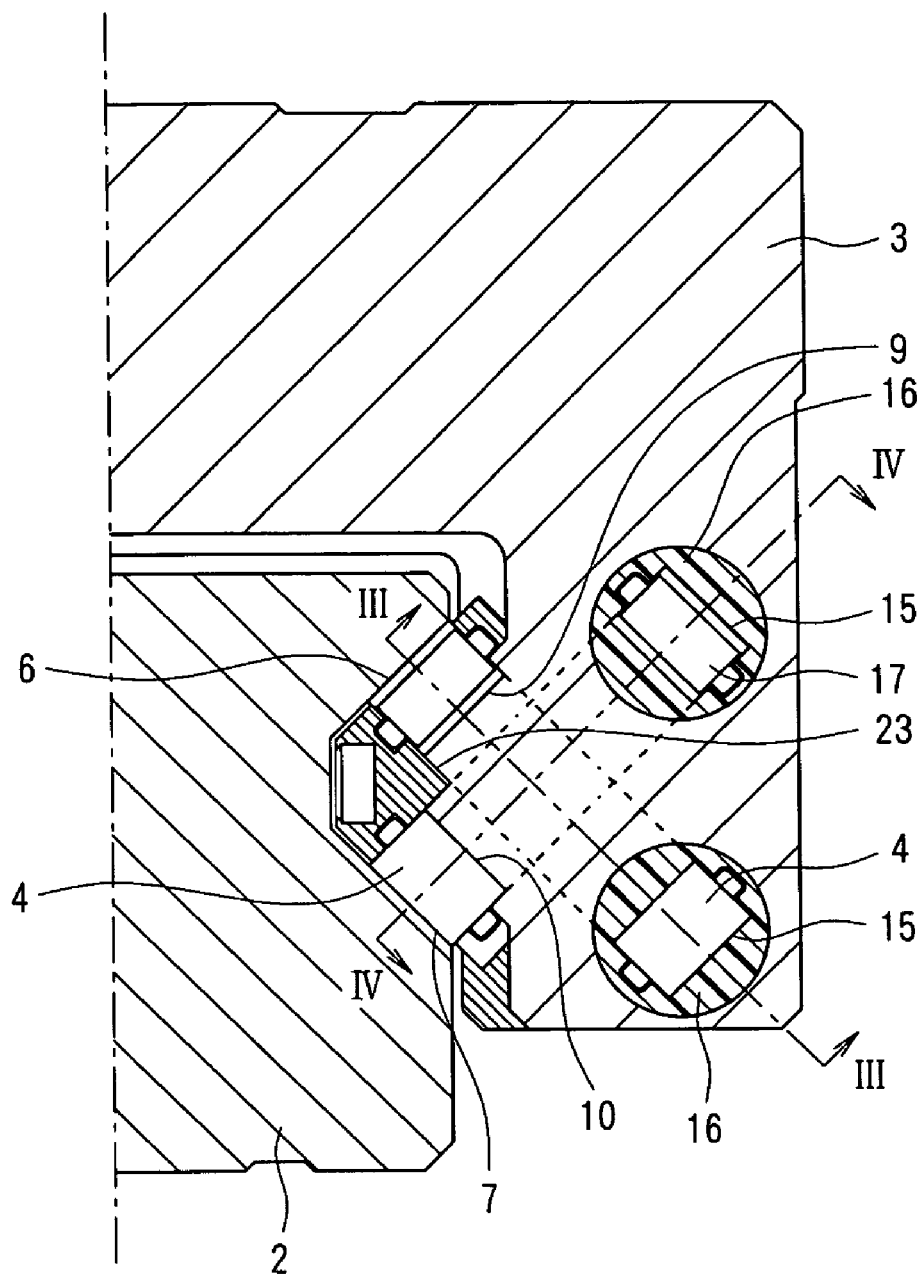
FIG. 2 is a one-half part cross sectional view of the linear guide apparatus shown in FIG. 1.
Figure 3:
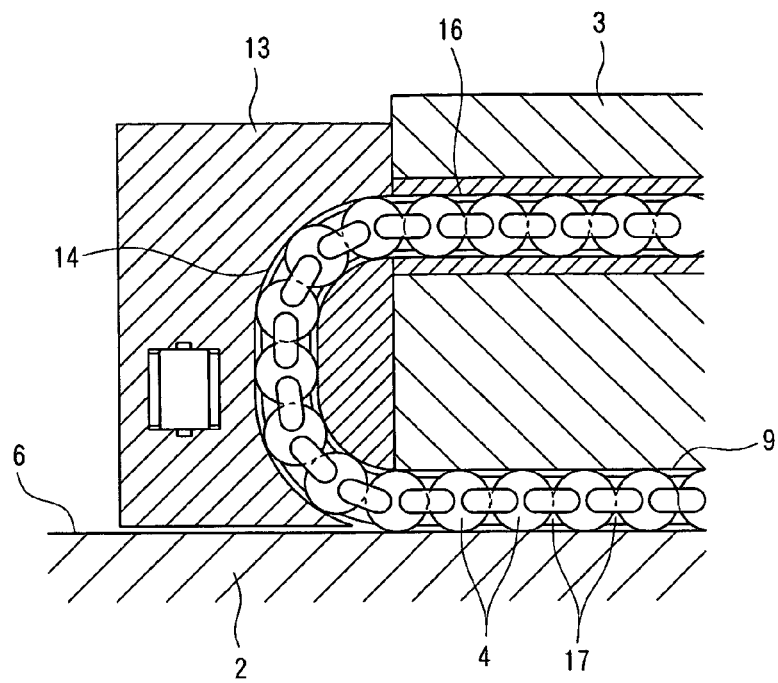
FIG. 3 is a cross sectional view along III—III in FIG. 2.
Figure 4:
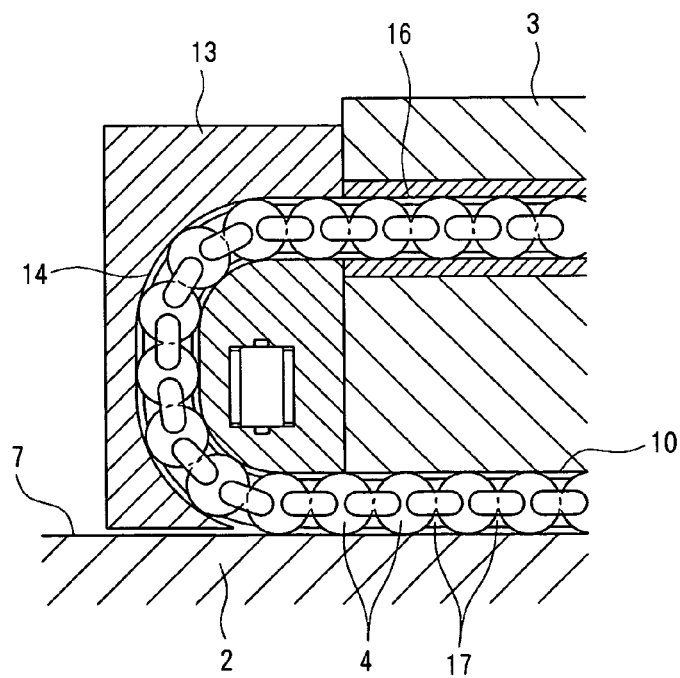
FIG. 4 is a cross sectional view along IV—IV in FIG. 2.

In FIG. 1 and FIG. 2, a linear guide apparatus 1 according to the first embodiment of the present invention comprises a rail 2, a slider 3, rolling elements 4, two rolling element holding member 5 and holding pieces 17. The cross section of the rail 2 perpendicular to the longitudinal direction thereof is formed approximately to an I-shaped configuration. The rail 2 has a right lateral surface and a left lateral surface with a first rail-side track face 6 and a second rail-side track face 7, respectively. The rail-side track faces 6, 7 are formed parallel with each other on the right and left lateral surfaces of the rail 2. The rail-side track faces 6, 7 are formed each linearly from one end to the other end of the rail, in which the first rail-side track face 6 is located at upper portions of the right and left sides of the rail 2, while the second rail-side track face 7 is located at lower portions of the right and left sides of the rail 2.

A plurality of stepped bolt holes 8 are engraved in the central portion at the upper surface of the rail 2. The bolt holes 8 are arranged each at an equal distance in the longitudinal direction of the rail 2. The rail 2 may be fixed on the base of a machine tool, etc. by bolts (not illustrated) inserted through the bolt holes 8.

The cross section of the slider 3 in perpendicular to the longitudinal direction of the rail 2 is formed into a saddle-like shape. The slider 3 has slider-side track faces 9, 10 formed parallel with each other on the right and left inner lateral surfaces of the slider 3. The slider-side track faces 9, 10 are opposed to the rail-side track faces 6, 7, respectively, to define rolling element running channels between the rail-side track faces 6, 7 and the slider-side track faces 9, 10. Plural threaded holes 11 are formed at the upper surface of the slider for mounting the slider by means of not-illustrated bolts to the moving bed of a machine tool, etc.

The slider 3 is adapted to move relatively in the longitudinal direction of the rail 2 when rolling elements 4 run under rolling along the rolling element running channels. Two end caps 13 are fixed on opposite end surfaces of the slider 3. The end caps 13 are made of resin or metal. The end caps 13 have four direction conversion channels 14 being passed to the running channels of the slider and rolling element return channels 15 (refer to FIG. 2) formed in the slider 3. The direction conversion channels 14 are curved in a U-shaped configuration (refer to FIG. 3 and FIG. 4) such that the rolling elements that roll along the rolling element running channels change their direction in the direction conversion channels 14, then enter a rolling element return channels 15 and then return to the original position passing through the rolling element return channels 15. The rolling element return channels 15 are formed by fitting a return channel forming member 16 made of a resin into a through hole formed in the slider 3.

Figure 5:
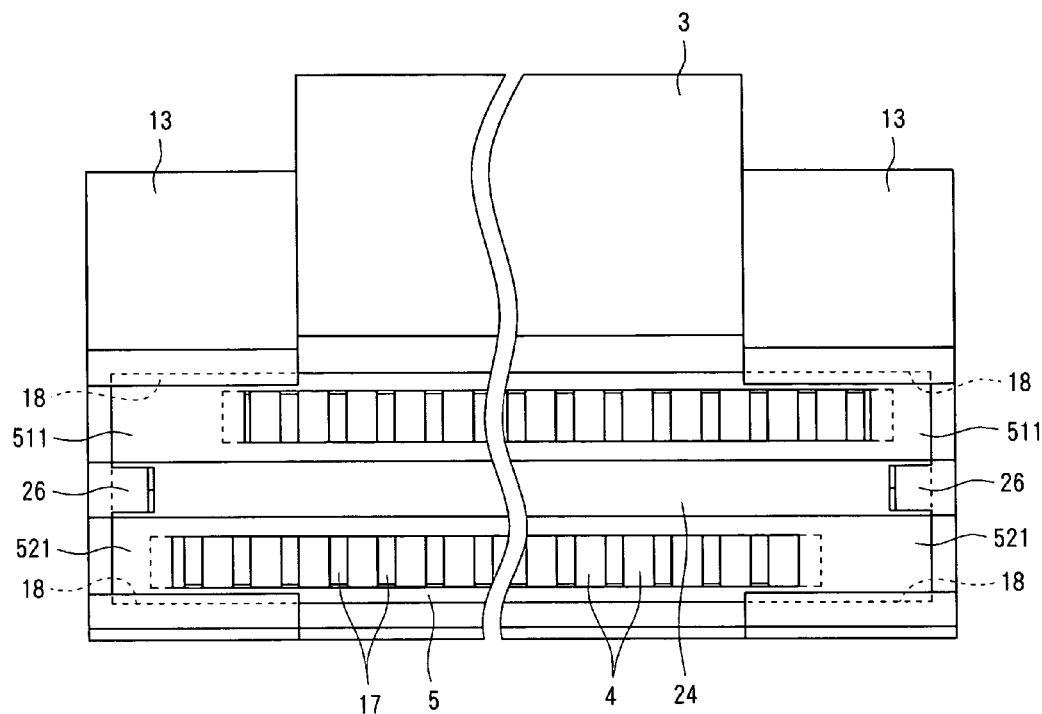
FIG. 5 is a view of a rolling element holding member shown in FIG. 2 as observed on the side of a rail.

The rolling elements 4 are formed as a cylindrical shape. The holding pieces 17 are interposed between each of the rolling elements (hereinafter referred to as "roller") 4 as shown in FIG. 5. The holding pieces 17 formed of a resin material have a pair of arms 171 for preventing skew of the roller 4 (refer to FIG. 9 to FIG. 11) so as to be in sliding contact with the opposite end faces of two adjacent rollers 4.

Figure 6:
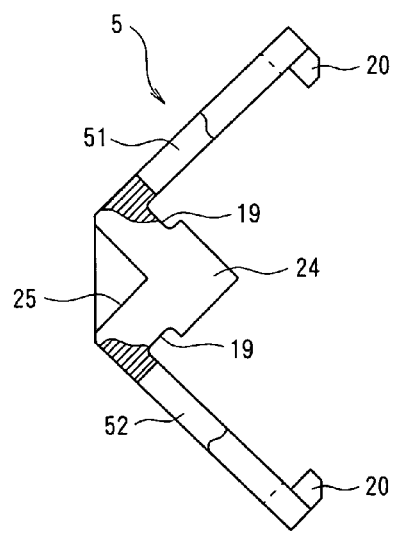
FIG. 6 is a side elevational view of the rolling element holding member shown in FIG. 5.
Figure 7:
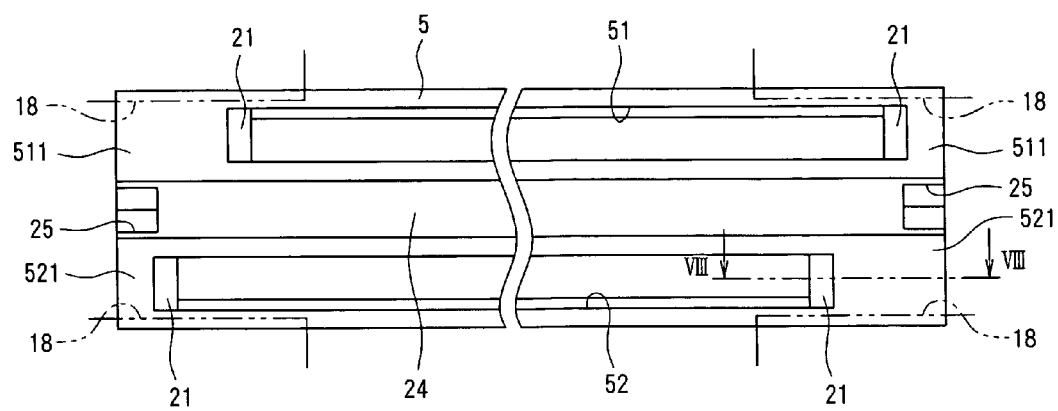
FIG. 7 is a front elevational view of the rolling element holding member shown in FIG. 5.
Figure 8:
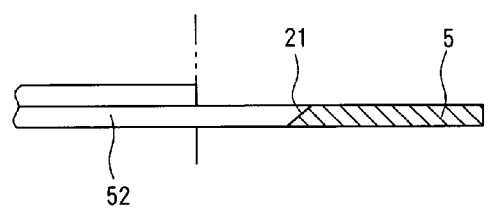
FIG. 8 is a cross sectional view along VII—VII in FIG. 7.
Figure 9:
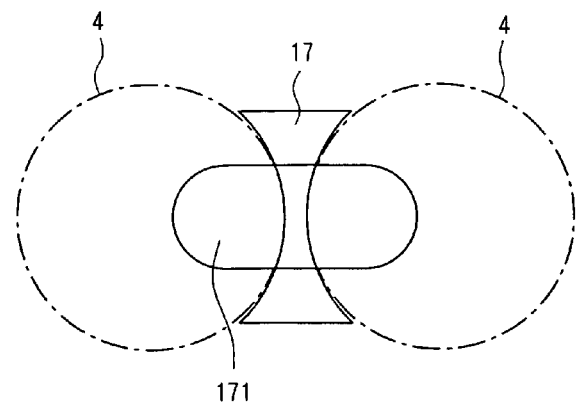
FIG. 9 is a side elevational view of a holding piece shown in FIG. 2.
Figure 10:
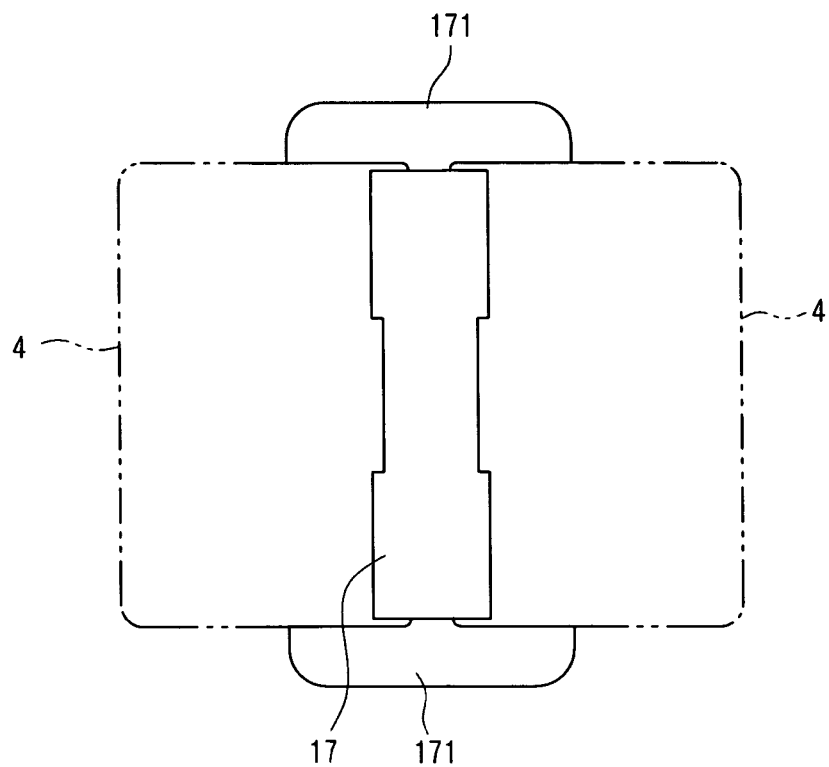
FIG. 10 is a plan view of a holding piece.
Figure 11:
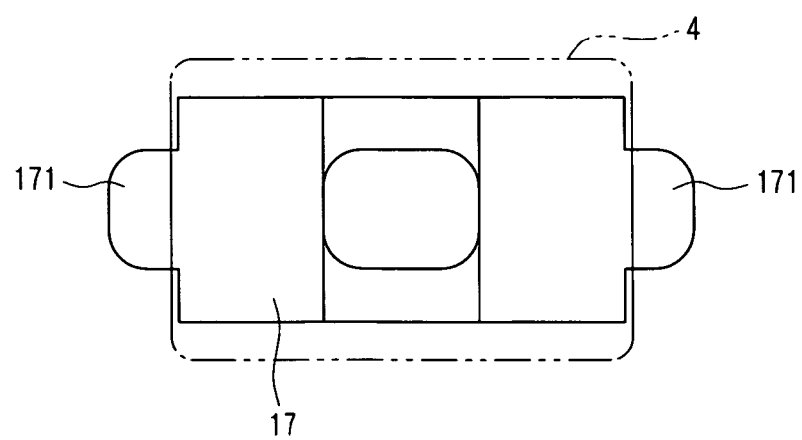
FIG. 11 is a front elevational view of a holding piece.

The rolling element holding members 5 have two holding windows 51, 52 for holding the rollers 4 arranged between the rail-side track faces 6, 7 and the slider-side track faces 9, 10 (refer to FIG. 6 and FIG. 7).

The holding windows 51, 52 of the rolling element holding members 5 are formed each into a rectangular shape. The end caps 13 have four retaining grooves 18 that are retaining portions (refer to FIG. 5, FIG. 13) engaging with opposite end portions 511, 512 of the rolling element holding members 5 (refer to FIG. 7). The holding members 5 are retained between the end caps 13, 13 by being engaged the opposite end portions 511, 512 of the holding members 5 to the retaining grooves 18 of the end caps 13.

The rolling element holding members 5 are provided with an engaging groove 19 and an engaging piece 20 for engagement with the arm 171 of the holding pieces 17 (refer to FIG. 6) along the longitudinal direction of the rail. The holding plates 5 have four slopes 21 (refer to FIG. 7 and FIG. 8) that are scooping portions for detaching the roller 4 from the holding windows 51, 52. The slopes 21 are located at opposite ends of the holding windows 51, 52. The rollers 4 held in the holding windows 51, 52 are guided to the direction conversion channels 14 of the end caps 13 by the slopes 21 of the rolling element holding members 5. The retaining grooves 18 are formed on the end caps 13 such that the slopes 21 of the holding members 5 are located between the retaining grooves 18.

Figure 12:
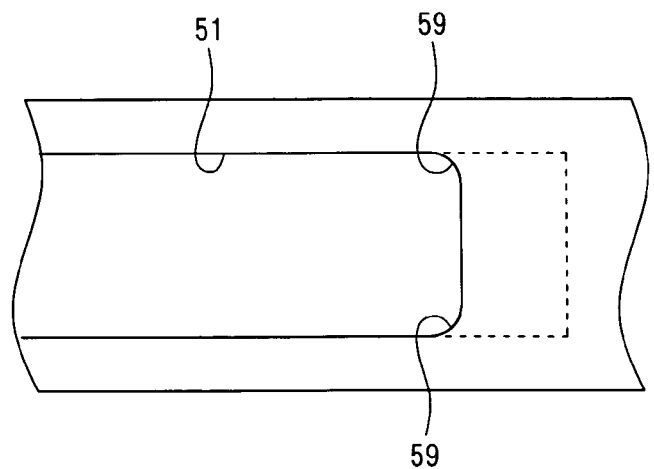
FIG. 12 is a plan view showing a portion of the rolling element holding members shown in FIG. 7.
Figure 13:
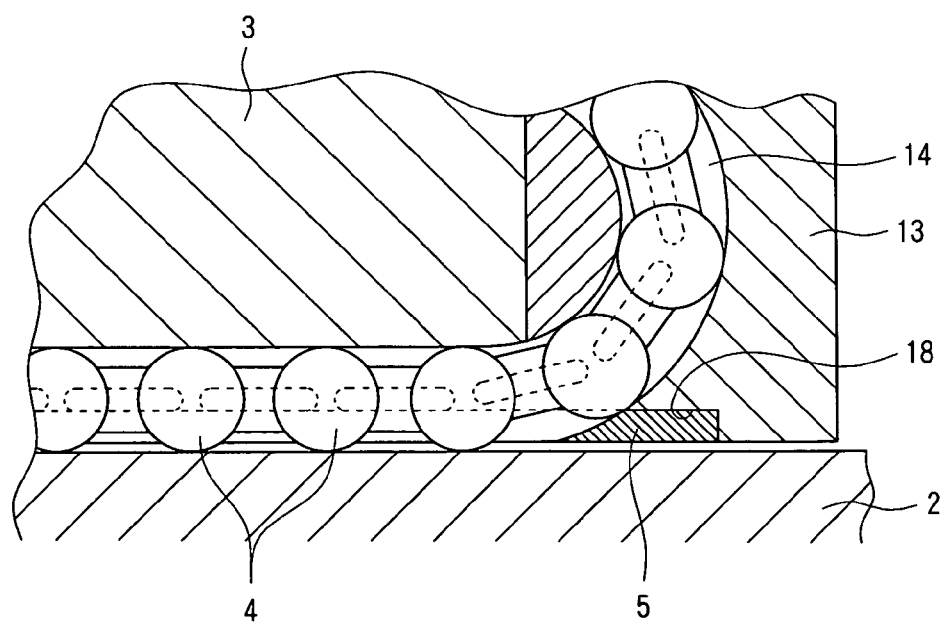
FIG. 13 is a view showing an engaging portion between the retaining groove of the end cap and the rolling element holding member shown in FIG. 5.

The holding windows 51, 52 are formed in the rolling element holding members 5 such that the slopes 21 situate on the side of the end caps 13. As shown in FIG. 12, each of opposite ends of the holding windows 51, 52 are formed in an arcuate shape at a corner 59 thereof.

The slider 3 has two positioning grooves 23 for positioning the holding members 5 (refer to FIG. 6). The positioning grooves 23 have a cross section formed into a V-shape. Further, the positioning grooves 23 are formed between the slider-side track faces 9, 10 (refer to FIG. 2). The rolling element holding members 5 have an engaging portion 24 engaging with one of the positioning grooves 23 of the slider 3. As shown in FIG. 7, the engaging portion 24 is formed between the holding windows 51, 52. The end caps 13 have two positioning portions 26 for positioning the holding members 5. The holding members 5 have two slits 25 (refer to FIG. 7) engaging with the positioning portions 26 of the end caps 13.

In the linear guide apparatus 1 according to the first embodiment of the present invention having thus been constituted, since the holding windows 51, 52 are formed in the rolling element holding members 5 such that the scooping portions (21) are located exterior to the opposite end surfaces of the slider (3) on the side of the end caps (13), the slopes 21 for detaching the roller from the holding windows 51, 52 of the holding members 5 situate at the engagement portion between the retaining grooves 18 of the end caps 13 and the rolling element holding members 5. Since this can escape the impact on the slopes 21 upon detachment of the roller 4 from the holding windows 51, 52 of the holding members 5 toward the end caps 13, it is possible to prevent deformation of the rolling element holding members 5 and contact thereof with the rail 2 by the impact on the slopes 21 and ensure smooth movement of the slider 3.

Further, in the first embodiment of the invention, since the retaining grooves 18 formed in the end caps 13 are formed parallel with the slider-side track faces 9 and 10, that is, in the direction of supporting the deformation of the rolling element holding members 5 by the effect of the roller 4 in the perpendicular direction, deformation of the holding members 15 can be prevented effectively. Further, since the slits 25 of the rolling element holding members 5 that fits the positioning portion 26 of the end caps 13 is provided on the opposite end portions of the positioned member 24 of the rolling element holding members 5, the holding effect of the end caps 13 to the rolling element holding members 5 increases, so that deformation of the rolling element holding members 5 to the side of the rail 2 can be prevented effectively.

Further, in the first embodiment of the present invention, since the corners 59 of the holding windows 51, 52 are formed each in an arcuate shape, occurrence of stress concentration to the slopes 21 of the rolling element holding members 5 caused by riding-over of the roller 4 can be suppressed to thereby ensure the integrity of the rolling element holding members 5 for a long period of time.

Figure 14:
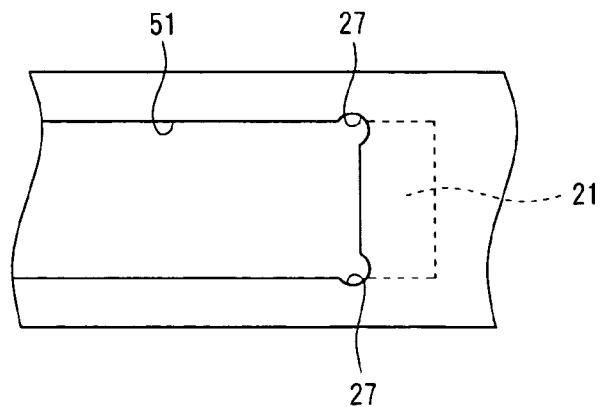
FIG. 14 is a plan view showing a portion of a rolling element holding member in a second embodiment of the invention.
Figure 15:
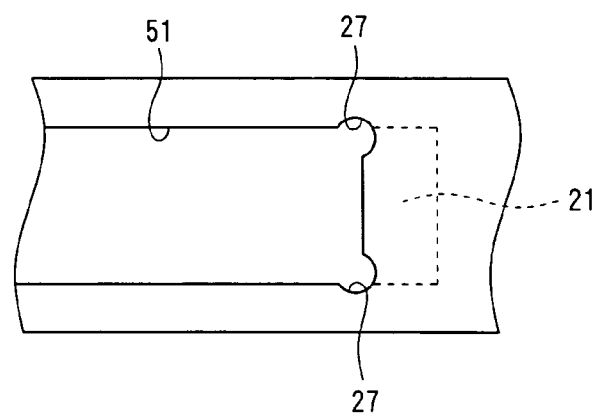
FIG. 15 is a plan view showing a portion of a rolling element holding member in a third embodiment of the invention.
Figure 16:
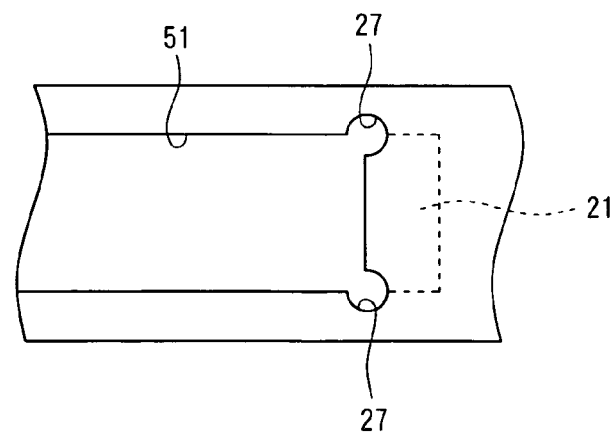
FIG. 16 is a plan view showing a portion of a rolling element holding member in a fourth embodiment of the invention.

In the first embodiment of the present invention described above, for suppressing the occurrence of stress concentration to the slopes 21 of the holding members 5, the corners 59 of the holding windows 51, 52 are formed each in an arcuate shape, but stress concentration occurring to the slopes 21 of the rolling element holding members 5 can be suppressed also by providing an arc shaped cut portion 27 at the corners of the holding windows 51, 52 as shown in FIG. 14 to FIG. 16.

Further, in the first embodiment of the present invention, the retaining grooves 18 of the end caps 13 are provided parallel with the slider-side track faces 9, 10 in order to prevent deformation of the rolling element holding members 5 to the side of the rail, but deformation of the rolling element holding members 5 to the rail can be prevented also by slanting the engaging grooves 18 at a predetermined angle relative to the slider-side track faces 9, 10.

Then, a fifth embodiment of the present invention is to be described with reference to FIG. 17 to FIG. 20.

Figure 17:
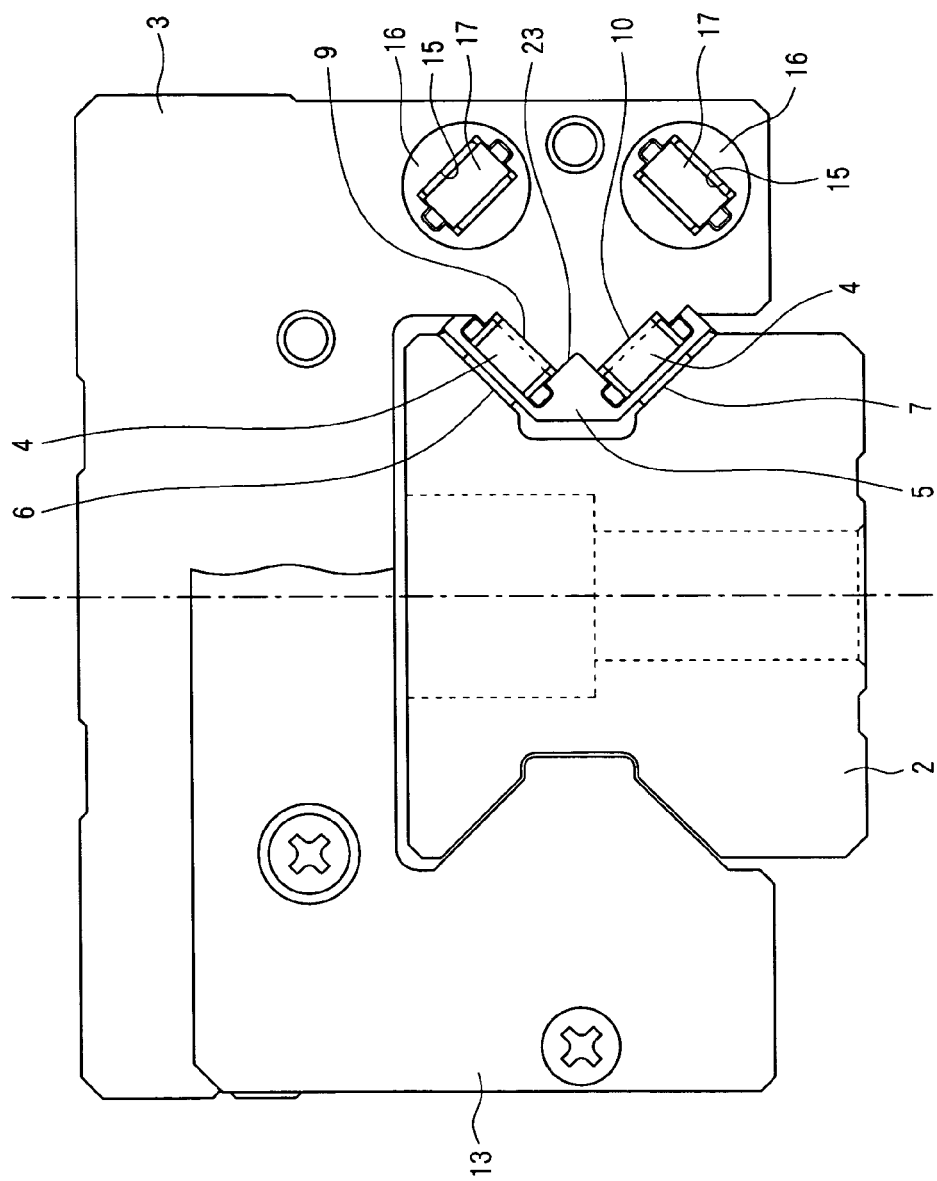
FIG. 17 is a front elevational view of a linear guide apparatus according to a fifth embodiment of the invention.
Figure 18:
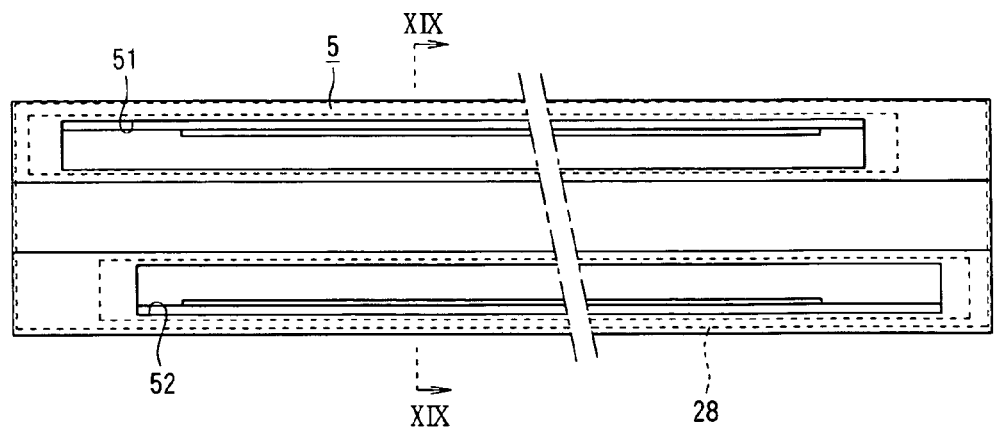
FIG. 18 is a plan view of a rolling element holding member shown in FIG. 17.

In FIG. 17, a linear guide apparatus according to the fifth embodiment of the present invention comprises a rail 2, a slider 3, rolling elements 4, two rolling element holding members 5 and holding pieces 17.

The cross section of the rail 2 perpendicular to the longitudinal direction thereof is formed approximately to an I-shaped configuration. The rail 2 has a right-side surface and a left-side surface with a first rail-side track face 6 and a second rail-side track face 7, respectively. The rail-side track faces 6, 7 are formed parallel with each other on the right-side surface and the left-side surface of the rail 2. The rail-side track faces 6, 7 are formed each linearly from one end to the other end of the rail. The rail-side track face 6 is located at upper portions of the right and left sides of the rail 2, while the rail-side track surface 7 is located at lower portions of the right and left sides of the rail 2.

The cross section of the slider 3 in perpendicular to the longitudinal direction of the rail 2 is formed into a saddle-like shape. The slider 3 has slider-side track faces 9, 10. The slider-side track faces 9, 10 are formed parallel with each other on the right and left inner lateral surfaces of the slider 3. The slider-side track faces 9, 10 are opposed to the rail track faces 6, 7, respectively, to define rolling element running channels between the rail-side track faces 6, 7 and the slider-side track faces 9, 10.

The slider 3 is adapted to move relatively in the longitudinal direction of the rail 2 when rolling elements 4 run under rolling along the rolling element running channels. Two end caps 13 are fixed on opposite end surfaces of the slider 3. The end caps 13 are made of resin or metal. Further, the end caps 13 have four direction conversion channels 14 passing to the running channels and rolling element return channels 15 formed in the slider 3. The direction conversion channels 14 of the end caps 13 are curved in a U-shaped configuration such that the rolling elements that roll along the rolling element running channels change their direction in the direction conversion channels 14, then enter the rolling element return channels 15 of the slider 3 and then return to the original position passing through the rolling element return channel 15. The rolling element return channel 15 are formed by fitting a return channel forming member 16 made of a resin into a through hole formed in the slider 3.

Figure 19:
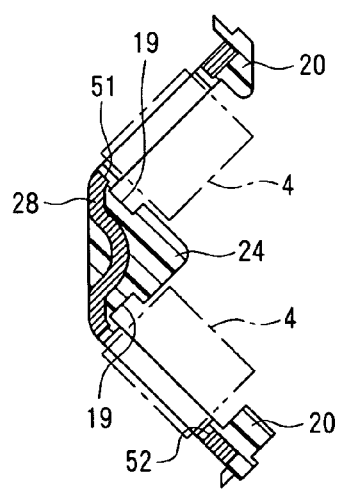
FIG. 19 is a cross sectional view along XI—XI in FIG. 18.

The rolling elements 4 situated in the rolling element running channels are held by the holding members 5 formed of a resin material. The holding members 5 having two rolling element holding windows 51, 52 are respectively reinforced by a reinforcing member 28 (refer to FIG. 18). The reinforcing member 28 is formed by bending a metal plate into a shape as shown in FIG. 19. Further, the reinforcing member 28 is buried in the rolling element holding members 5, respectively. The reinforcing member 28 has two plate portions 281, 282 situated between the track faces 6, 7 of the rail and the track faces 9, 10 of the slider, and a connection portion 283 for connecting the plate portions 281, 282. The plate portions 281, 282 of the reinforcing member 28 have a rectangular window 284 for guiding the roller 4 in the longitudinal direction of the rail 2.

In the fifth embodiment of the present invention having thus been constituted, since the reinforcing member 28 formed by bending the metal plate into a predetermined shape is buried in the holding members 5 made of the resin, the rigidity of the holding members 5 is improved compared with the holding members made of resin not having the reinforcing member. Thus, since the holding members 5 are not deformed greatly even when an external force exerts on the holding members 5, it is possible to prevent the roller 4 from popping out of the holding members 5 during assembling of the linear guide apparatus.

Further, since the plate portions 281, 282 of the reinforcing member 28 have the rectangular-shaped window 284 for guiding the roller 4, it is not necessary to form a flange for suppressing the skew of the roller 4 to the inner surface of the slider, an abrasion stone of a relatively simple shape can be used when grinding the slider track surface, by which the slider-side track faces, 9, 10 can be ground at a relatively low cost.

Figure 20:
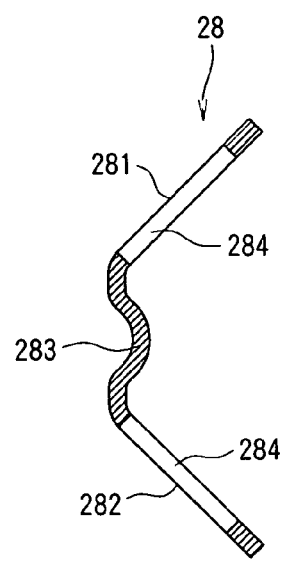
FIG. 20 is a cross sectional view of a reinforcing member shown in FIG. 19.
Figure 21:
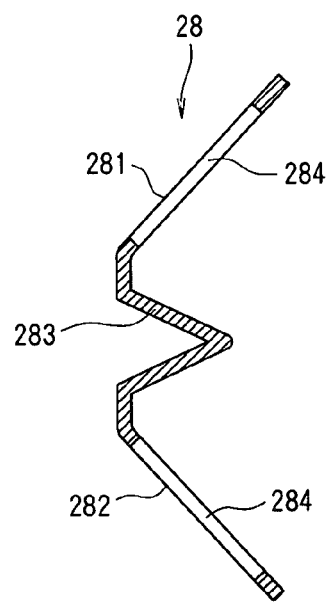
FIG. 21 is a cross sectional view of a reinforcing member in a sixth embodiment of the invention.
Figure 22:
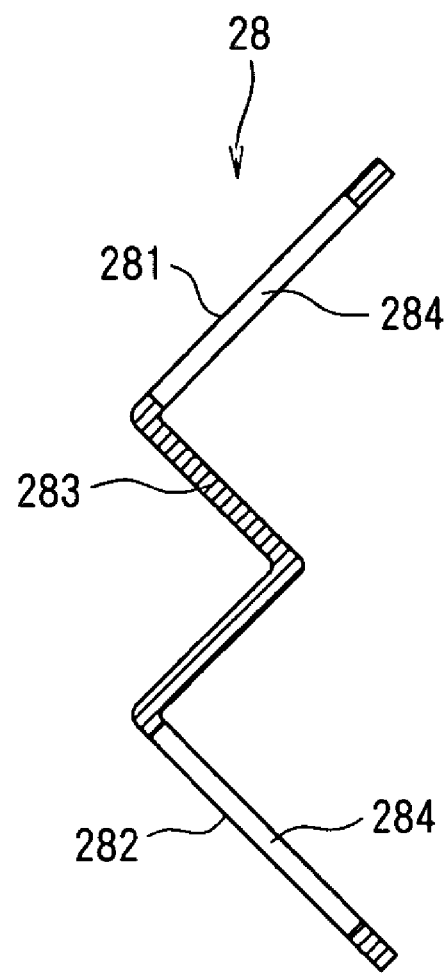
FIG. 22 is a cross sectional view of a reinforcing member in a seventh embodiment of the invention.

In the fifth embodiment of the invention, while the metal plate bent into the shape as shown in FIG. 20 is used as the reinforcing member 28 to be buried in the rolling element holding members 5, a metal bent into a shape, for example, as shown in FIG. 21 or FIG. 22 may also be used as the reinforcing member 28.

FIGS. 23A and 23B show the deformation amount of the holding members in a case of using the reinforcing member 28 shown in FIG. 20 and the deformation amount of the holding members in a case of using a flat plate-like reinforcing member. In the drawing, FIG. 23A shows the deformation amount of holding members in a case of using the reinforcing member 28 shown in FIG. 20 and FIG. 23B shows a deformation amount of holding members in a case of using a flat plate-like reinforcing member.

As apparent also from FIGS. 23A and 23B, it can be seen that the deformation amount of the holding members is decreased and the rigidity of the holding members is improved compared with the case where the reinforcing member are a flat plate shape as a reinforcing member to be buried in the holding members 5.

An eighth embodiment of the present invention is to be described with reference to FIG. 24 to FIG. 28.

Figure 24:
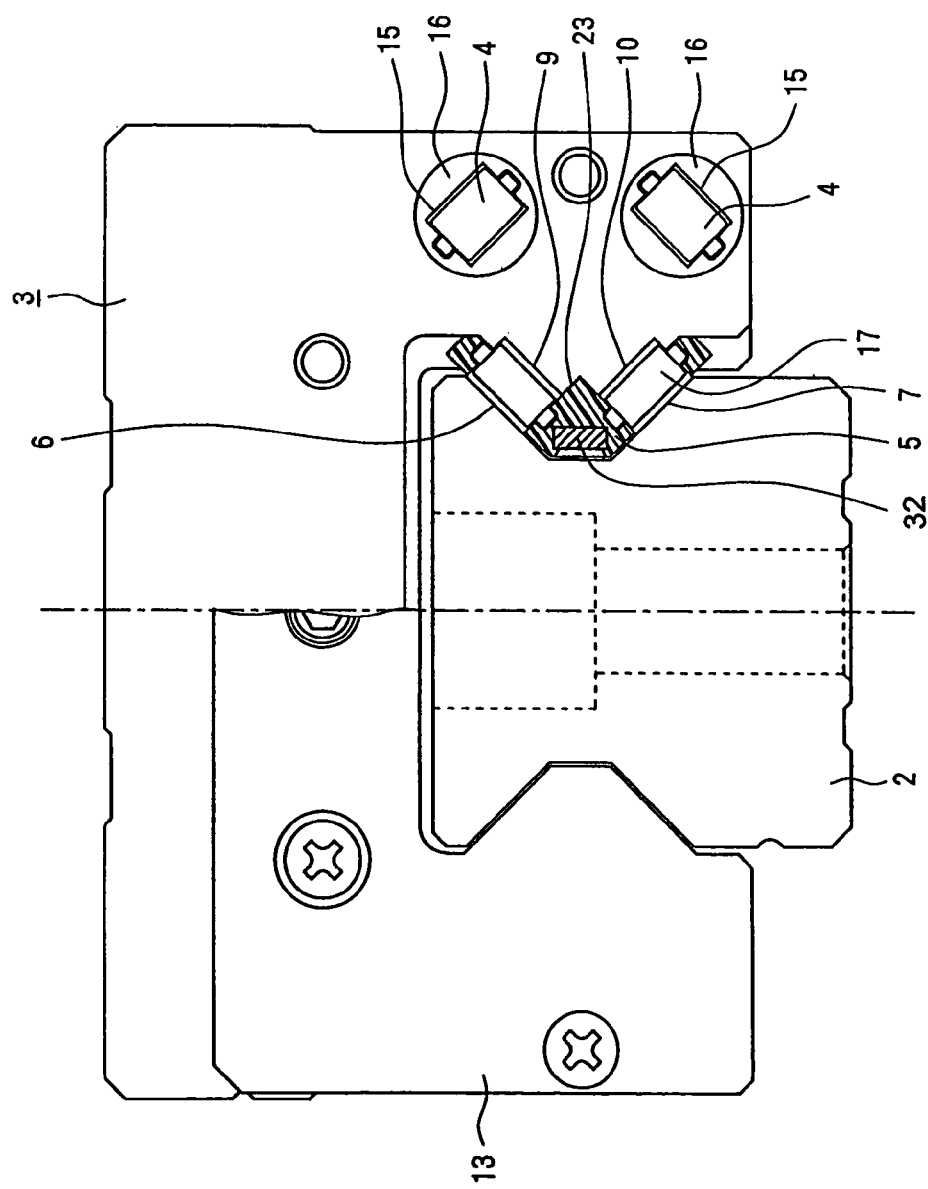
FIG. 24 is a front elevational view of a linear guide apparatus according to an eighth embodiment of the invention.
Figure 25:
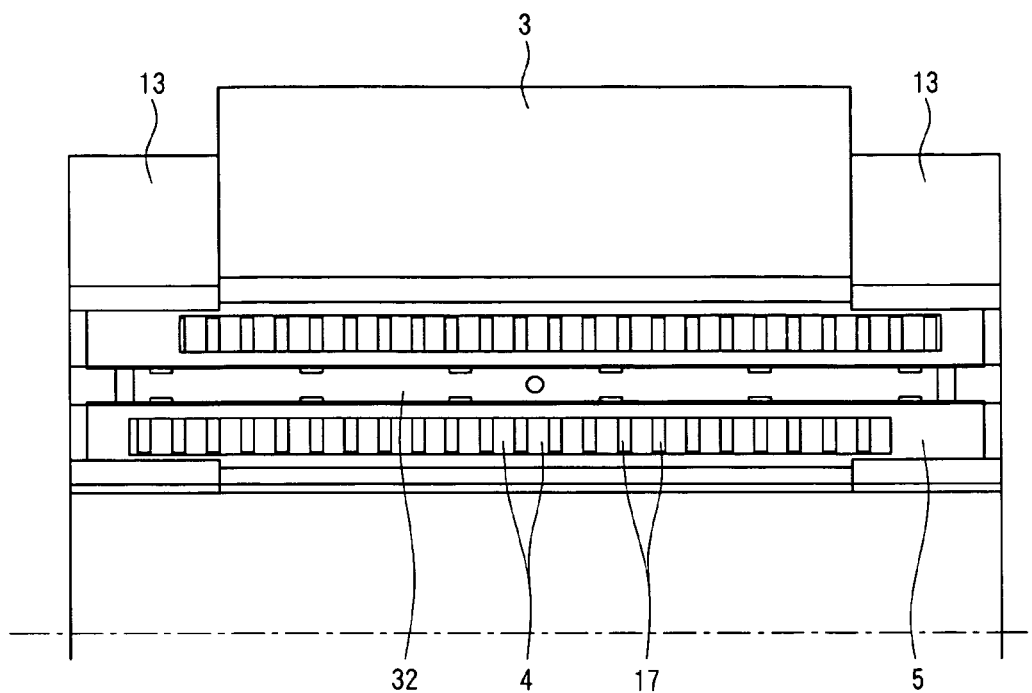
FIG. 25 is a view of the rolling element holding members shown in FIG. 24 as observed on the side of a rail.
Figure 26:
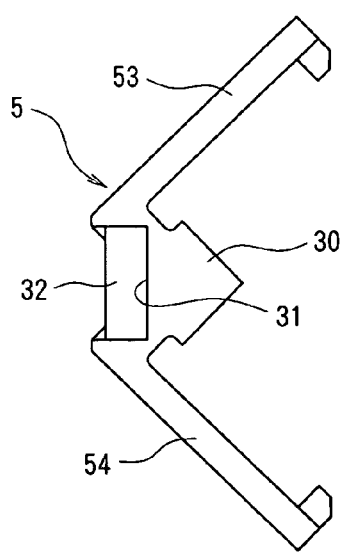
FIG. 26 is a side elevational view of the rolling element holding members shown in FIG. 25.
Figure 27:
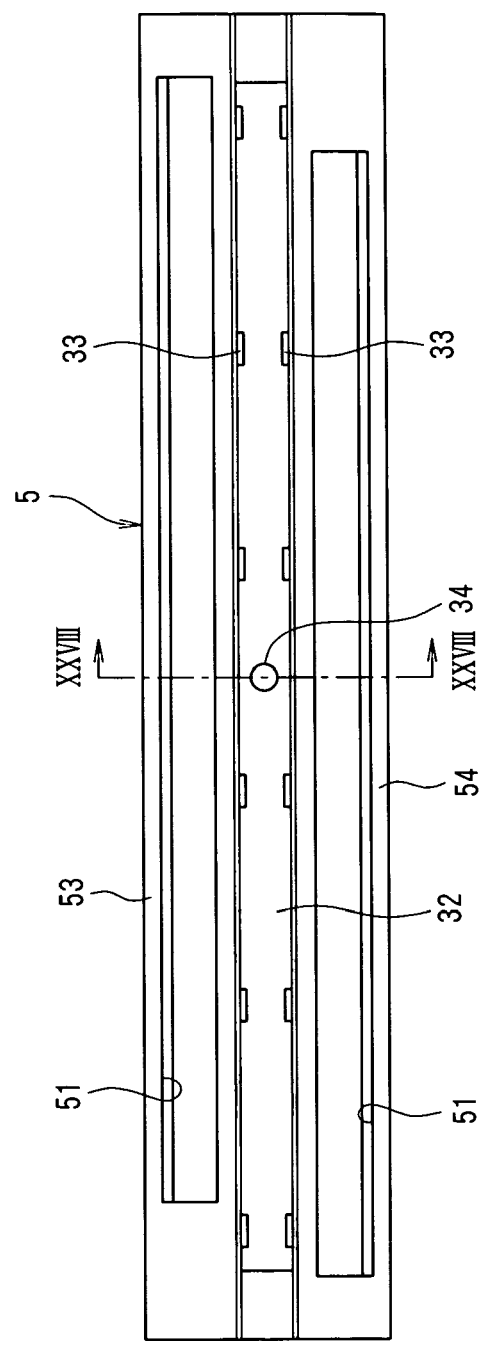
FIG. 27 is a view of the rolling element holding members shown in FIG. 25 as observed on the side of a rail.
Figure 28:
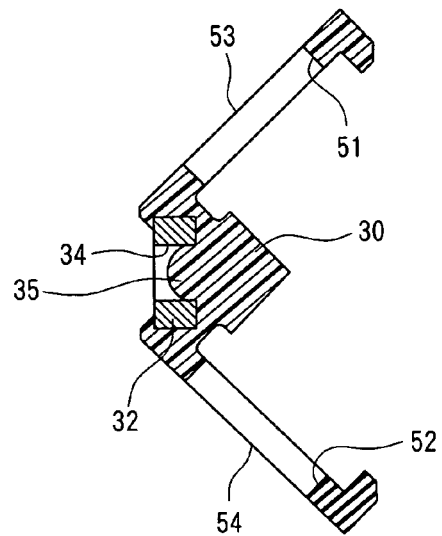
FIG. 28 is a cross sectional view along XXVIII—XXVIII in FIG. 27.

In FIG. 24, a linear guide apparatus 1 according to the first embodiment of the present invention comprises a rail 2, a slider 3, rolling elements 4, two holding members 5 and holding pieces 17.

The cross section of the rail 2 perpendicular to the longitudinal direction thereof is formed approximately to an I-shaped configuration. The rail 2 has a right-side surface and a left-side surface with a first rail-side track face 6 and a second rail-side track face 7, respectively. The rail-side track faces 6, 7 are formed parallel with each other on the right-side surface and the left-side surface of the rail 2. The rail-side track faces 6, 7 are formed each linearly from one end to the other end of the rail, in which the first rail track face 6 is located at upper portions of the right and left sides of the rail 2, while the second rail track face 7 is located at lower portions of the right and left sides of the rail 2.

The cross section of the slider 3 in perpendicular to the longitudinal direction of the rail 2 is formed into a saddle-like shape. The slider 3 has slider-side track faces 9, 10 formed parallel with each other on the right and left inner lateral surfaces of the slider 3. The slider-side track faces 9, 10 are opposed to the rail-side track faces 6, 7, respectively, to define rolling element running channels between the track faces 6, 7 of the rail 2 and the track faces 9, 10 of the slider 3.

The slider 3 is adapted to move relatively in the longitudinal direction of the rail 2 when rolling elements 4 run under rolling along the running channels. Two end caps 13 are fixed on opposite end surfaces of the slider 3. The end caps 13 are made of resin or metal. The end caps 13 have four direction conversion channels passing to the rolling element running channels and rolling element return channels 15 formed in the slider 3. The direction conversion channels of the end caps 13 are curved in a U-shaped configuration such that the rolling elements that roll along the rolling element running channels change their direction in the direction conversion channels, then enter a rolling element return channels 15 formed in the slider 3 and then return to the original position passing through the rolling element return channels 15. The rolling element return channels 15 are formed by fitting a return channel forming member 16 made of a resin into a through hole formed in the slider 3.

The rolling elements 4 in the running channels are held by two rectangular windows 51 formed in the holding members 5 formed of a resin. The slider 3 has two positioning grooves 23 of a V-shaped cross section for positioning the holding members 5. The grooves 23 are formed on the inner surfaces of the slider 3. The holding members 5 have a plate-like first rolling element holding portion 53 of a plate-like configuration situated between the rail-side track faces 6 and the slider-side track faces 9, and a second plate-like rolling element holding portion 54 situated between the rail-side track faces 7 and the slider-side track faces 10 (refer to FIG. 26 and FIG. 27). Further, the holding members 5 have an engaging portion 30 of a V-shaped cross section engaging to one of the positioning grooves 23 of the slider 3.

The engaging portion 30 of the holding members 5 is formed between the holding portions 53 and 54, and is formed integrally with the holding members 5. Further, the engaging portion 30 has a reinforcing member attaching surface 31 at a portion opposing to the rail 2 (refer to FIG. 26 and FIG. 27). The holding members 5 are reinforced by a plate-like reinforcing member 32 attached on the attaching surface 31, respectively. The reinforcing plate 32 is made of a metal.

The reinforcing plate 32 has a length substantially equal with the holding members 5. Further, the reinforcing member 32 is bent into an arcuate shape such that it is concaved to the rail 2. The holding members 5 have plural fingers 33 (refer to FIG. 27) for fixing the reinforcing plate 32 on the attaching surface 31.

The reinforcing member attaching surface 31 of the holding members 5 is formed into a rectangular shape along the longitudinal direction of the rail 2. The reinforcing plate 32 has a positioning hole 34 (refer to FIG. 28) engaging to a protrusion portion 35 formed on the central portion of the reinforcing member attaching surface 31 (refer to FIG. 28).

In the eighth embodiment of the present invention having thus been constituted, since the reinforcing member attaching surface 31 is provided to the engaging portion 30 of the holding members 5 and the reinforcing member 32 made of a metal is provided to the reinforcing member attaching surface 31, the rigidity of the holding members 5 is improved. Since this can suppress the deformation of the holding members 5 and the contact thereof with the rail 2 can be suppressed, smooth movement of the slider 3 can be ensured.

Further, in the eighth embodiment of the present invention, since the reinforcing member attached surface 31 of the holding members 5 is located at the side of the rail, and the reinforcing member 32 fixed on the reinforcing member attaching surface 31 is curved in an arcuate shape so as to concave relative to the rail 2, it can reliably prevent the deformation of the holding members 5 on the side of the rail and contact thereof with the rail 2 compared with the case of using a flat plate-like metal plate as the reinforcing member 32.

Further, in the eighth embodiment of the present invention, since the reinforcing member 32 are made of the metal plate, the attaching attitude of the reinforcing member can be stabilized compared with a reinforcing member having a circular cross section in the direction perpendicular to the longitudinal direction.

Further, in the eighth embodiment of the present invention, since the holding members have the plural fingers 33 engaging with the reinforcing plate 32, since the reinforcing plate 32 can be fixed to the reinforcing member attaching surface 31 of the holding members without using machine screws or the likes, so that increase of the number of parts can be suppressed.

Further, in the eighth embodiment of the present invention, since the protrusion 35 fitting the positioning hole 34 formed in the reinforcing member 32 is provided to a central portion of the holding members 5, if the holding members 5 and the reinforcing member 32 include dimensional errors or dimensional changes in the longitudinal direction, they are not influenced to each other and deformation of the holding members 5 can be suppressed.

Then, a ninth embodiment of the present invention is to be described with reference to FIG. 29 to FIG. 32.

Figure 29:
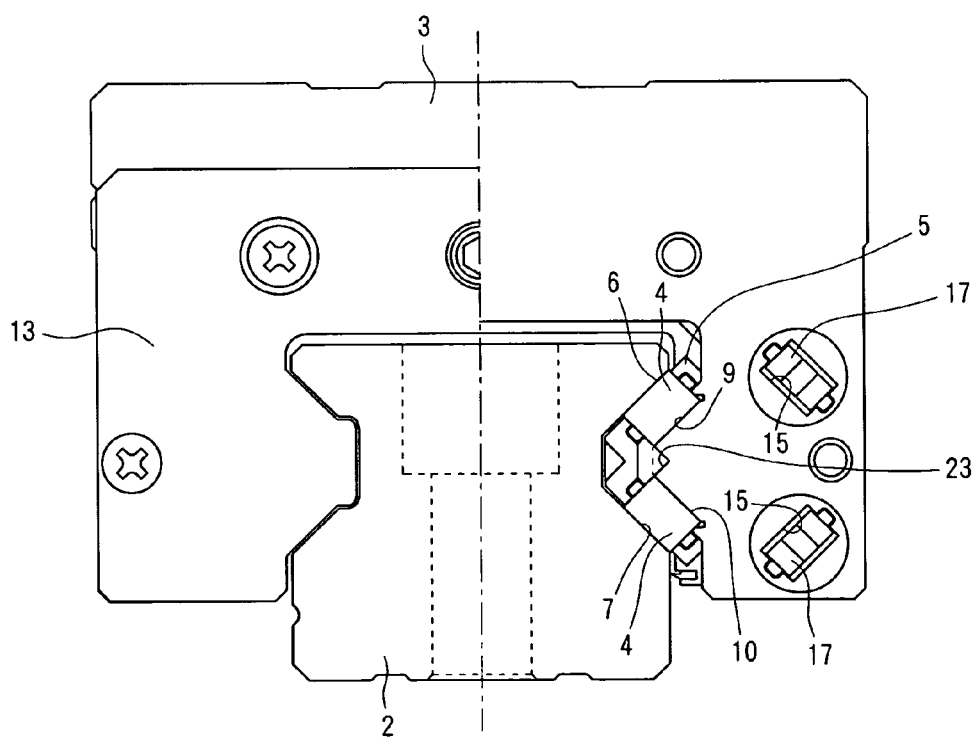
FIG. 29 is a front elevational view of a linear guide apparatus according to a ninth embodiment of the invention.

In FIG. 29, a linear guide apparatus according to the ninth embodiment of the present invention comprises a rail 2, a slider 3, rolling elements 4, two holding member 5 and holding pieces 17.

The cross section of the rail 2 perpendicular to the longitudinal direction thereof is formed approximately to an I-shaped configuration. The rail 2 has a right-side surface and a left-side surface with a first rail-side track face 6 and a second rail-side track face 7, respectively. The rail-side track faces 6, 7 are formed parallel with each other on the right-side surface and the left-side surface of the rail 2. The rail-side track faces 6, 7 are formed each linearly from one end to the other end of the rail 2, in which the first rail-side track surface 6 is located at upper portions of the right and left sides of the rail 2, while the second rail-side track surface 7 is located at lower portions of the right and left sides of the rail 2.

The cross section of the slider 3 in perpendicular to the longitudinal direction of the rail 2 is formed into a saddle-like shape. The slider 3 has slider-side track faces 9, 10. The slider-side track faces 9, 10 are formed parallel with each other on the right and left inner lateral surfaces of the slider 3. The slider-side track faces 9, 10 are opposed to the rail track faces 6, 7, respectively, to define rolling element running channels between the rail-side track faces 6, 7 and the slider-side track faces 9, 10.

The slider 3 is adapted to move relatively in the longitudinal direction of the rail 2 when rolling elements 4 run under rolling along the rolling element running channels. Two end caps 13 are fixed on opposite end surfaces of the slider 3. The end caps 13 made of resin or metal have four direction conversion channels passing to the rolling element running channels and rolling element return channels 15 formed in the slider 3. The direction conversion channels are curved in a U-shaped configuration such that the rolling elements that roll along the rolling element running channels change their direction in the direction conversion channels, then enter the rolling element return channels 15 of the slider 3 and then return to the original position passing through the rolling element return channels 15.

The rolling elements 4 in the running channels are held by the holding members 5 formed of a resin. The slider 3 has two positioning grooves 23 of a V-shaped cross section for positioning the holding members 5. The grooves 23 are formed on the inner surfaces of the slider 3. The holding members 5 have a plate-like first rolling element holding portion 53 of a plate-like configuration situated between the rail-side track faces 6 and the slider-side track faces 9, and a second plate-like rolling element holding portion 54 situated between the rail-side track faces 7 and the slider-side track faces 10 (refer to FIG. 30 and FIG. 31). The rolling element holding portions 53, 54 have a rectangular window 51, 52 for holding the rolling elements 4.

Figure 30:
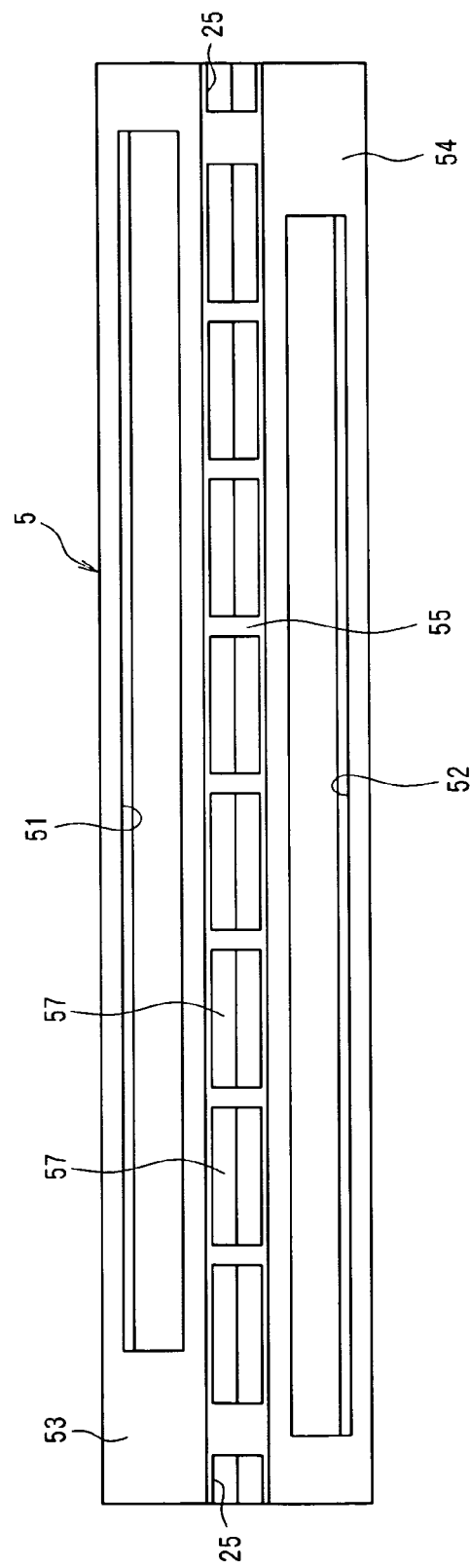
FIG. 30 is a view of the rolling element holding members shown in FIG. 29 as observed on the side of a rail.
Figure 31:
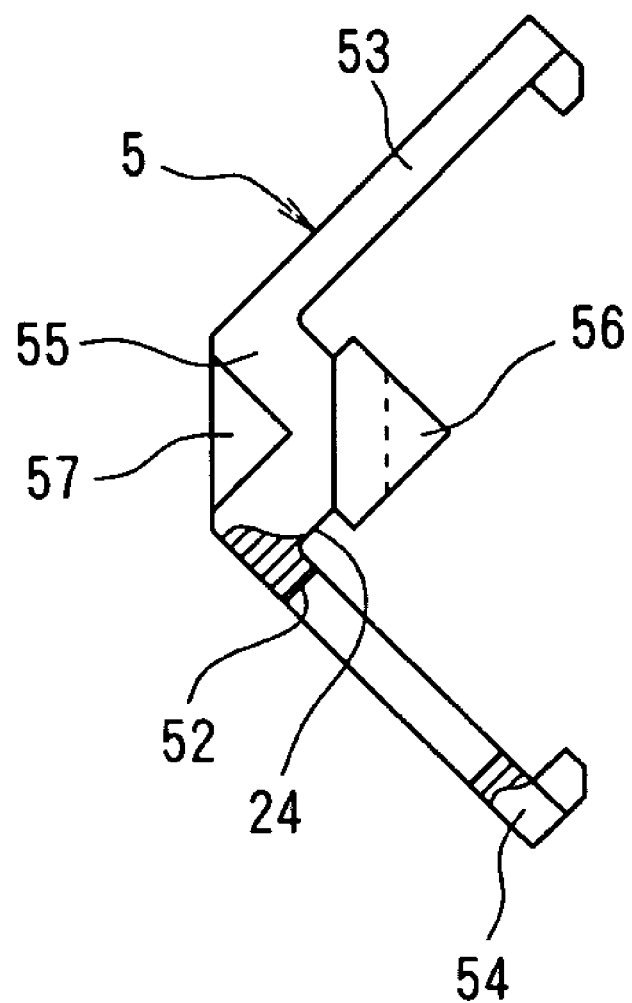
FIG. 31 is a side elevational view of the rolling element holding members shown in FIG. 30.
Figure 32:
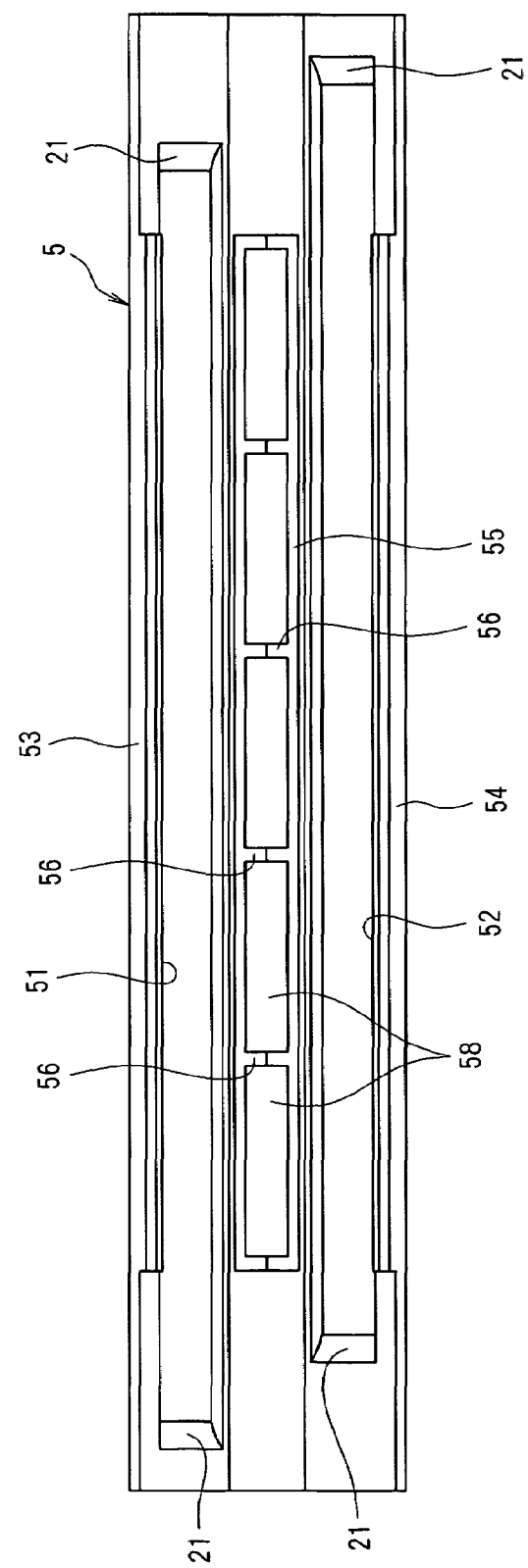
FIG. 32 is a view of the rolling element holding members shown in FIG. 29 as observed on the side of a rail.

Further, the holding members 5 have a connection portion 55 for connecting the holding portions 53, 54. The connection portion 55 has plural protrusions 56 fitting to one of the positioning groove 23 (refer to FIG. 31 and FIG. 32). The protrusions 56 are formed on the connection portion 55 each at an equal distance in the longitudinal direction of the rail. The protrusions 56 are formed to the connection part 55 on the side of the slider. The connection part 55 of the holding members 5 has plural concave portions 57 at the side of the rail as shown in FIG. 30 and FIG. 31.

In the ninth embodiment of the present invention having thus been constituted, since the plural protrusions 56 fitting the positioning grooves 23 of the slider 3 are provided to the connection portion 55 of the holding members 5 made of the resin, a blanked portion 58 is defined between each of the protrusions 56 upon resin molding the holding members 5, the shrinkage of the holding members 5 during resin molding can be decreased compared with a case where the protrusion fitting the positioning grooves 23 of the slider 3 is formed continuously from one end in the longitudinal direction to the other end in the longitudinal direction of the connection portion 55. Since this enables resin mold of the holding members 5 at a uniform thickness, it is possible to prevent deformation that hinders smooth running of the slider 3 caused to the rolling element holding members 5 by the unevenness of the thickness.

Further, when the opposite end portions of the holding members 5 are fit into the retaining grooves of the end caps 13, since the opposite end portions of the holding members 5 are fit into the retaining grooves of the end caps 13 in a state of elastically deforming the holding members 5 in an arcuate shape, the holding members 5 restore the original linear shape after fitting the opposite end portions of the holding members 5 into the retaining grooves of the end caps 13, so that it is possible to prevent the deformation of the holding members 5 toward the rail and contact thereof with the rail 2.

The invention claimed is:

1. A linear guide apparatus comprising:
 a rail (2) having a right lateral face and a left lateral face;
 a slider (3) having end caps (13) at opposite ends thereof and slider-side track faces (9, 10) facing first rail-side track faces (6) and second rail-side track faces (7) respectively formed on the right and left lateral faces of the rail;
 a plurality of rollers (4) that roll on the rail-side track faces and the slider-side track faces along with linear movement of the slider relative to the rail;
 holding pieces (17) interposed between adjacent rollers (4); and
 rolling element holding members (5) that provide holding windows (51, 52), which guide the rollers (4) in a rolling direction and each of which is formed into an elongate shape along the rail;
 wherein the rolling element holding members (5) are disposed between the end caps by engagement of retaining portions (18) formed on the end caps and opposite ends (511, 521) of the windows (51, 52);
 wherein the rolling element holding members (5) have slopes (21) formed on the opposite ends (511, 521) of the windows (51, 52) with all portions of the slopes (21) protruding from opposite end surfaces of the slider (3) to the end caps (13) in order to detach the rollers (4) from the windows (51, 52); and
 wherein the rolling element holding members (5) have engaging grooves (19) provided adjacent the windows (51, 52) and opposite axial end faces of the rollers (4) for engagement with arms (171) which guide the holding pieces (17) in the rolling direction.

2. A linear guide apparatus according to claim 1, wherein the retaining portions (18) are inclined at a predetermined angle relative to the slider-side track faces (9, 10).

3. A linear guide apparatus according to claim 1, wherein the retaining portions (18) are formed parallel with the rail-side track faces (6, 7).

4. A linear guide apparatus according to claim 1, wherein the rolling element holding members (5) are positioned between the slider-side track faces (9, 10) by positioning grooves (23) formed on the slider (3).

5. A linear guide apparatus according to claim 1, wherein the windows (51, 52) of the rolling element holding members (5) have corners (59) each formed into an arcuate shape.

6. A linear guide apparatus according to claim 1, wherein the windows (51, 52) of the rolling element holding members (5) have an arc shaped cut portion (27) at corners thereof.

7. A linear guide apparatus comprising:
 a rail (2) having a right lateral face and a left lateral face;
 a slider (3) having end caps (13) at opposite ends thereof and slider-side track faces (9, 10) facing first rail-side track faces (6) and second rail-side track faces (7) respectively formed on the right and left lateral faces of the rail;
 a plurality of rolling elements (4) that roll on the rail-side track faces and the slider-side track faces along with linear movement of the slider relative to the rail; and
 rolling element holding members (5) having holding windows (51, 52) each formed into an elongate shape along the rail;
 wherein the rolling element holding members (5) are disposed between the end caps by engagement of retaining portions (18) formed on the end caps and opposite ends (511, 521) of the windows (51, 52);
 wherein the rolling element holding members (5) have slopes (21) formed on the opposite ends (511, 521) of the windows (51, 52) with all portions of the slopes (21) protruding from opposite end surfaces of the slider (3) to the end caps (13) in order to detach the rolling elements (4) from the windows (51, 52), and
 wherein the rolling element holding members (5) have engaging portions (25) formed at opposite ends, in a longitudinal direction, of the rolling element holding members and engaging with positioning portions (26) respectively formed on the end caps (13).

8. A linear guide apparatus comprising:
 a rail (2) having a right lateral face and a left lateral face;
 a slider (3) having slider-side track faces (9, 10) facing first rail-side track faces (6) and second rail-side track faces (7) respectively formed on the right and left lateral faces of the rail;
 a plurality of rolling elements (4) that roll on the rail-side track faces and the slider-side track faces along with linear movement of the slider relative to the rail;
 rolling element holding members (5) having windows (51, 52) for holding the rolling elements situated between the rail-side track faces and the slider-side track faces; and
 reinforcing members (28) for reinforcing the holding members (5);
 wherein the reinforcing members (28) are buried in the holding members (5), which are made of a resin.

9. A linear guide apparatus according to claim 8, wherein the reinforcing members (28) have two plate portions (281, 282) situated between the rail-side track faces (6, 7) and the slider-side track faces (9, 10).

10. A linear guide apparatus according to claim 9, wherein the plate portions (281, 282) of the reinforcing members have guide windows (284) for guiding the rolling elements (4) in the longitudinal direction of the rail (2).

11. A linear guide apparatus comprising:
a rail (2) having a right lateral face and a left lateral face;
a slider (3) having slider-side track faces (9, 10) facing first rail-side track faces (6) and second rail-side track faces (7) respectively formed on the right and left lateral faces of the rail;
a plurality of rolling elements (4) that roll on the rail-side track faces and the slider-side track faces along with linear movement of the slider relative to the rail; and
rolling element holding members (5) made of a resin having rolling element holding portions (53, 54) for holding the rolling elements situated between the rail-side track faces and the slider-side track faces, in which the slider (3) has positioning grooves (23) for positioning the holding members (5);
wherein at least one reinforcing member (32) for reinforcing the rolling element holding members (5) has a length substantially equal with that of the holding members (5).

12. A linear guide apparatus according to claim 11, wherein the reinforcing members (32) are plate shaped.

13. A linear guide apparatus according to claim 11, wherein each rolling element holding member (5) has an engaging portion (30) for engaging one of the positioning grooves (23) of the slider (3).

14. A linear guide apparatus according to claim 13, wherein the engaging portion (30) has a reinforcing member attaching surface (31) at a portion opposed to the rail (2).

15. A linear guide apparatus according to claim 14, wherein the rolling element holding member has plural fingers (33) engaging with the reinforcing member (32) in order to fix the reinforcing member (32) on the reinforcing member attaching surface (31) of the engaging portion (30).

16. A linear guide apparatus according to claim 14, wherein the rolling element holding member has a protrusion (35) engaging with a positioning hole (34) formed in the reinforcing member (32).

17. A linear guide apparatus comprising:
a rail (2) having a right lateral face and a left lateral face;
a slider (3) including positioning grooves and having slider-side track faces (9, 10) facing first rail-side track faces (6) and second rail-side track faces (7) respectively formed on the right and left lateral faces of the rail;
end caps (13) fixed on opposite end surfaces of the slider in the longitudinal direction of the rail;
a plurality of rolling elements (4) that roll on the rail-side and the slider-side track faces along with linear movement of the slider relative to the rail; and
rolling element holding members (5) having two rolling element holding portions (53, 54) situated between the rail-side track faces (6, 7) and the slider-side track faces (9, 10), and connection portions (55) for connecting the rolling element holding portions (53, 54);
wherein the connection portions (55) of the rolling element holding members (5) have protrusions (56) that engage with the positioning grooves (23) of the slider.

18. A linear guide apparatus according to claim 17, wherein the rolling element holding members (5) are assembled to the slider (3) in a convex state opposite to the rail (2).

19. A linear guide apparatus comprising:
a rail (2) having a right lateral face and a left lateral face;
a slider (3) having end caps (13) at opposite ends thereof and slider-side track faces (9, 10) facing first rail-side track faces (6) and second rail-side track faces (7) respectively formed on the right and left lateral faces of the rail;
a plurality of rollers (4) that roll on the rail-side track faces (6, 7) and the slider-side track faces (9, 10) along with linear movement of the slider relative to the rail (2); and
rolling element holding members (5), which provide a first holding window (51) opposite to the first rail-side track faces (6) and a second holding window (52) opposite to the second rail-side track faces (7) such that the holding windows (51, 52) guide the rollers (4) in a rolling direction and are formed into elongated shapes along the rail;
wherein the rolling element holding members (5) are disposed between the end caps by engagement of retaining portions (18) formed on the end caps and opposite ends of each of the holding windows (51, 52);
wherein the rolling element holding members (5) have slopes (21) formed on opposite ends (511, 521) of each of the windows (51, 52) with all portions of the slopes (21) protruding from opposite end surfaces of the slider (3) to the end caps (13) in order to detach the rollers (4) from the windows (51, 52); and
wherein each of the windows (51, 52) is located, with a different position, in the rolling direction of the rollers so that roller circulation can pass from the rolling element channels to rolling return channels (15) through direction conversion channels (14).

* * * * *